United States Patent [19]

Brand et al.

[11] Patent Number: 4,710,834

[45] Date of Patent: Dec. 1, 1987

[54] APPARATUS FOR POSITIONING A MAGNETIC DISK READ HEAD WITH PULSE OPERATED DETENT MAGNET

[75] Inventors: Wilhelm Brand, Rosenheim; Vaclav Vanek, Haar; Franz Jakobec, Unterhaching, all of Fed. Rep. of Germany

[73] Assignee: Siemens Aktiengesellschaft, Berlin and Munich, Fed. Rep. of Germany

[21] Appl. No.: 749,312

[22] Filed: Jun. 26, 1985

[30] Foreign Application Priority Data

Jun. 26, 1984 [DE] Fed. Rep. of Germany ....... 3423502

[51] Int. Cl.⁴ .............................................. G11B 5/59
[52] U.S. Cl. ..................................... 360/105; 360/106
[58] Field of Search ............................ 360/105, 97–99, 360/106

[56] References Cited

U.S. PATENT DOCUMENTS 4,139,874  2/1979  Shiraishi ....................... 360/105 X
4,484,241 11/1984  Brende .......................... 360/105
4,562,500 12/1985  Bygdnes ........................ 360/105

Primary Examiner—A. J. Heinz
Attorney, Agent, or Firm—Hill, Van Santen, Steadman & Simpson

[57] ABSTRACT

A positioning mechanism for a magnetic fixed (or hard) disk storage unit incorporates a bearing block forming part of the magnet system for the rotational positioner, and carrying a positioning shaft. A pivot member rotationally seated on the shaft has pivot arms carrying magnetic heads and brackets for carrying the magnetic coil for positioning the heads. A pulse operated detent magnet is provided and incorporates a stop armature. The armature is biased into detent retaining position, but is restrained by retaining spring in mechanically self-holding condition. It is automatically released when the pivot member swings into the detent position, corresponding to the landing zone for the magnetic heads.

14 Claims, 5 Drawing Figures

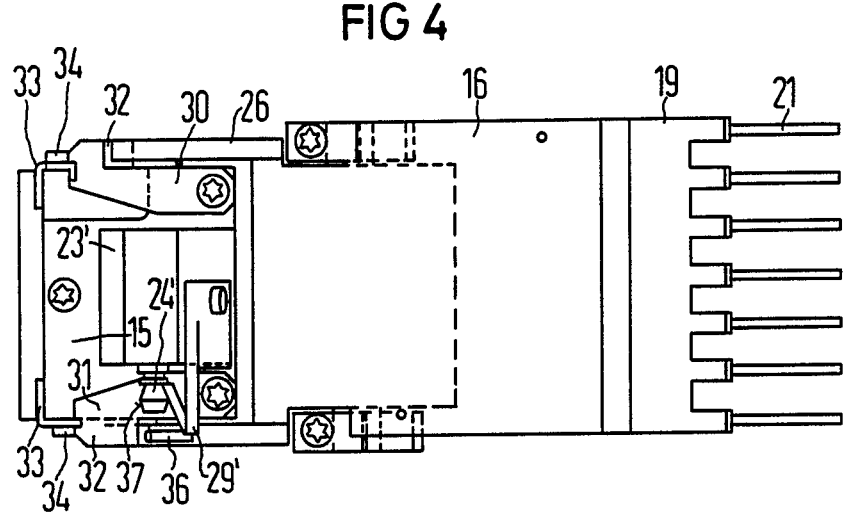
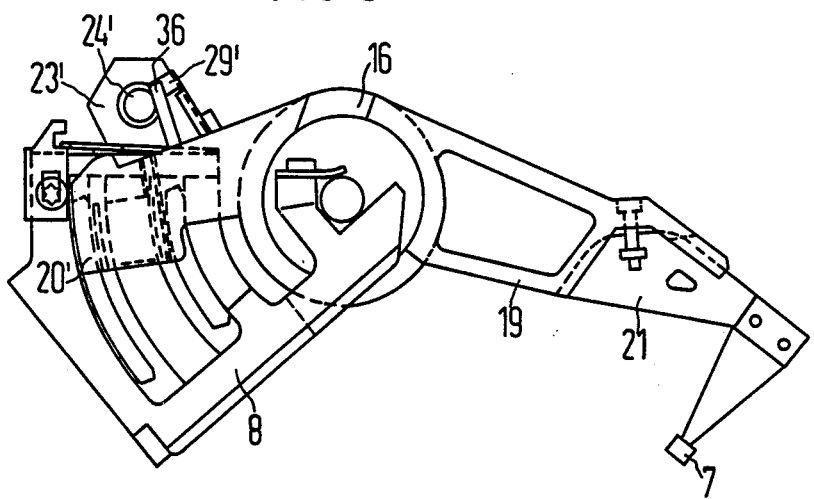

APPARATUS FOR POSITIONING A MAGNETIC DISK READ HEAD WITH PULSE OPERATED DETENT MAGNET

BACKGROUND OF THE INVENTION

1. Field of the Invention

The present invention relates to magnetic disk recording systems, and more particularly to apparatus and a method for positioning the read/write head in relation to the disk.

2. The Prior Art

Technical development in magnetic disk storage apparatus is continuing toward increasingly higher storage capacities, with respect to track density, and bit density, which are both characteristics for the storage capacity of the disk surface, as well as with respect to the mechanical structure, in order to accommodate as many as possible magnetic disks in a prescribed mounting space. As an example, the so-called 5¼ inch fixed disk (or hard disk) storage employs a standard mounting space having an overall height of 82.5 mm and a base area of 146 mm×203 mm. A fixed disk storage has a fixed (i.e. not replaceable) spindle and disk pack.

In addition to efforts to accommodate as many magnetic disks as possible within this prescribed mounting space, which concern the mechanical structure of the disk pack and its arrangement in the housing of the storage device, there are also attempts to improve the magnetic head positioning mechanism in order to improve access time, positioning precision, and reading reliability. A significant step in the direction toward higher storage density is achieved by use of a positioning method wherein magnetic heads are no longer absolutely positioned relative to the magnetic disks but are positioned relative to a servo track recorded on the disk.

In this positioning method, the positioning mechanism is an integral part of the servo control circuit. Accordingly, the mechanical properties of the positioner mechanism are a factor in determining access time, access precision, the stability of the positioning control loop, and the operational reliability of the disk storage device.

Two different types of positioner mechanisms have been developed, which are referred to as a linear positioner, and a rotational positioner. Linear positioners comprise a positioning carriage carrying the magnetic head positioning arms, this carriage being moved radially relative to the disk pack for the selection of tracks thereon, by means, for example, of a moving coil system. Rotational positioners employ a pivot part which is rotatable about an axis parallel to the axis of the disk pack. This pivot part comprises a one or more positioning arms, each carrying magnetic heads, and also a pair of brackets which lie on opposite sides of the pivoting arms relative to the positioning shaft. The brackets carry either a coil which is subjected to a force as a result of the field of a stationary magnet, or on the other hand carry a magnet, in which case the driving coil is mounted in fixed position. In the former case, the rotational positioner is referred to as a swinging coil positioner, and the later condition is referred to as a magnetic armature positioner.

Both types of rotational positioners are equivalent, in comparison with the above mentioned linear positioner. Rotational positioners are quite frequently employed with smaller magnetic disk storage units, since the mass which has to be moved by them is lower, and they can readily be constructed in small sizes and use little energy. These rotational positioners are therefore faster and lower in inertia, i.e. they are easier to control. Also, they generate less injurious heat inside the disk storage device due to their low energy consumptions.

Such rotational positioners are described for example in IEEE Transactions on Magnetics, Vol. Mag-17, No. 4, July 1981, pages 1392 and following, in Electronics, Apr. 21, 1982, pages 181 and following, and in Mini-Micro Systems, February 1983, pages 143 and following. Given today's storage density, the extremely precise positioning of the magnetic heads on the surfaces of the magnetic storage disks allocated to them is essential. In ongoing operation, the heads fly contact-free above the surface, gliding on an air pillow. When a minimum relative speed between the head and disk is not maintained, this air pillow collapses and the head lands on the disk surface. Such a landing must at all costs not occur in the disk region exploited for the information storage (referred to as the data region). A landing region is therefore defined, and the rotational positioner moves the head to the landing region when it is in idle condition. It must be assured that the rotational positioner is pivotable into the data region only when the disk storage drive is running. An enable magnet is employed for this purpose in known rotational positioners, which functions so as not to release the rotational positioner until after the disk storage drive has been energized. The enable magnet remains actuated during the entire operating time of the disk drive, and thus has to be designed for continuous operation. This contributes to power consumption and the generation of heat. It also contributes a quantity of electromagnetic noise, which may interfere with the normal operation of the disk storage system.

BRIEF DESCRIPTION OF THE INVENTION

A principal object of the present invention is therefore to create a rotational positioner which has an unequivocal and reliable detent position in idle condition, and can be placed in operation easily and without disrupting operation of the disk drive unit. It is also an object to provide such a rotational positioner with a means for making the transition from the data area into the detent position in order to avoid head damage and damage to the disk, that is, in order to produce a reliable landing of the magnetic heads within the landing area. Preferably the landing area is on the inside of the tracks of the magnetic storage disks, adjacent the hub of the disk storage device. It is also an object of the present invention to provide a rotational positioner in which the maximum excursion (adjacent the outer edge of the disk) is approached with accuracy but not exceeded.

These objects are achieved in the present, invention by means of employing a detent electro magnet designed for electric pulse operation, and which includes a solenoid with a stop armature which, after a brief excitation of the detent magnet, enables the pivot member for free movement, as long as the pivot member does not swing back into the detent position.

In accordance with the present invention, it is particularly advantageous that the detent magnet need not be excited either during normal operation nor in the idle condition of the disk storage device. On the contrary, a short duration excitation of the detent magnet (by a pulse) suffices to enable the rotational position for track selection, this excitation being triggered by a single enable pulse. Due to the mechanical locking mechanism of the detent magnet, lock condition is maintained until, in case of a malfunction or normal shut down of the disk storage device, the rotational positioner automatically sets itself into the landing area during the slow down of the disk drive, and thereby unlatches the mechanical interlock of the detent magnet. Since the detent magnet is always engaged only in a brief duration operation, it can be more liberally dimensioned. Moreover it acts neither as an electromagnetic noise source nor as an undesired heat source duration operation.

An advantageous improvement of the invention is comprised in that the stop armature of the detent magnet is designed as a pin within the solenoid of the electro-magnet and has a disk-shaped shoulder on its one end projecting from the detent magnet, with a compression spring being disposed between the shoulder and the detent magnet, such spring being disposed coaxially to the stop armature and biasing it toward its outer position. A latch mechanism is provided which retains the stop armature in its release position, opposing the spring power of the compression spring, after excitation of the detent magnet. This extremely simple structure advantageously exploits the fact that the detent magnet is only operated for brief periods, and can therefore be designed without concern for the power consumption and excess heat generated during continuous operation. Accordingly, the detent magnet can be made relatively large and powerful, so that a relatively large stroke of the stop armature is made possible, without attendant problems of power consumption and heat generation.

Another advantageous improvement of the present invention is comprised in a braking mechanism which is provided. The braking mechanism acts on the pivot member, and takes effect as soon as the pivot member runs into its final position (corresponding to the detent position). This achieves two additional advantages. First, the fixing of the detent position is assured with the assistance of the detent magnet in order to prevent a movement of the pivot member away from the detent position into the data region. Also the braking mechanism takes effect in the opposite direction, thus preventing a swing of the rotational positioner beyond the landing area in the direction toward the hub of the disk pack. Secondly, the braking mechanism damps the swivel motion of the pivot member into the detent position, and this contributes to an avoiding of damage to the sensitive magnetic heads when they touch down in the landing area.

These and other advantages of the present invention will become manifest by review of the following description and the accompanying drawings.

BRIEF DESCRIPTION OF THE DRAWINGS

Reference will now be made to the accompanying drawings, in which:

FIGS. 4 and 5 illustrate two views of a further embodiment having a modified detent mechanism.

DESCRIPTION OF THE PREFERRED EMBODIMENTS

Figure 1:
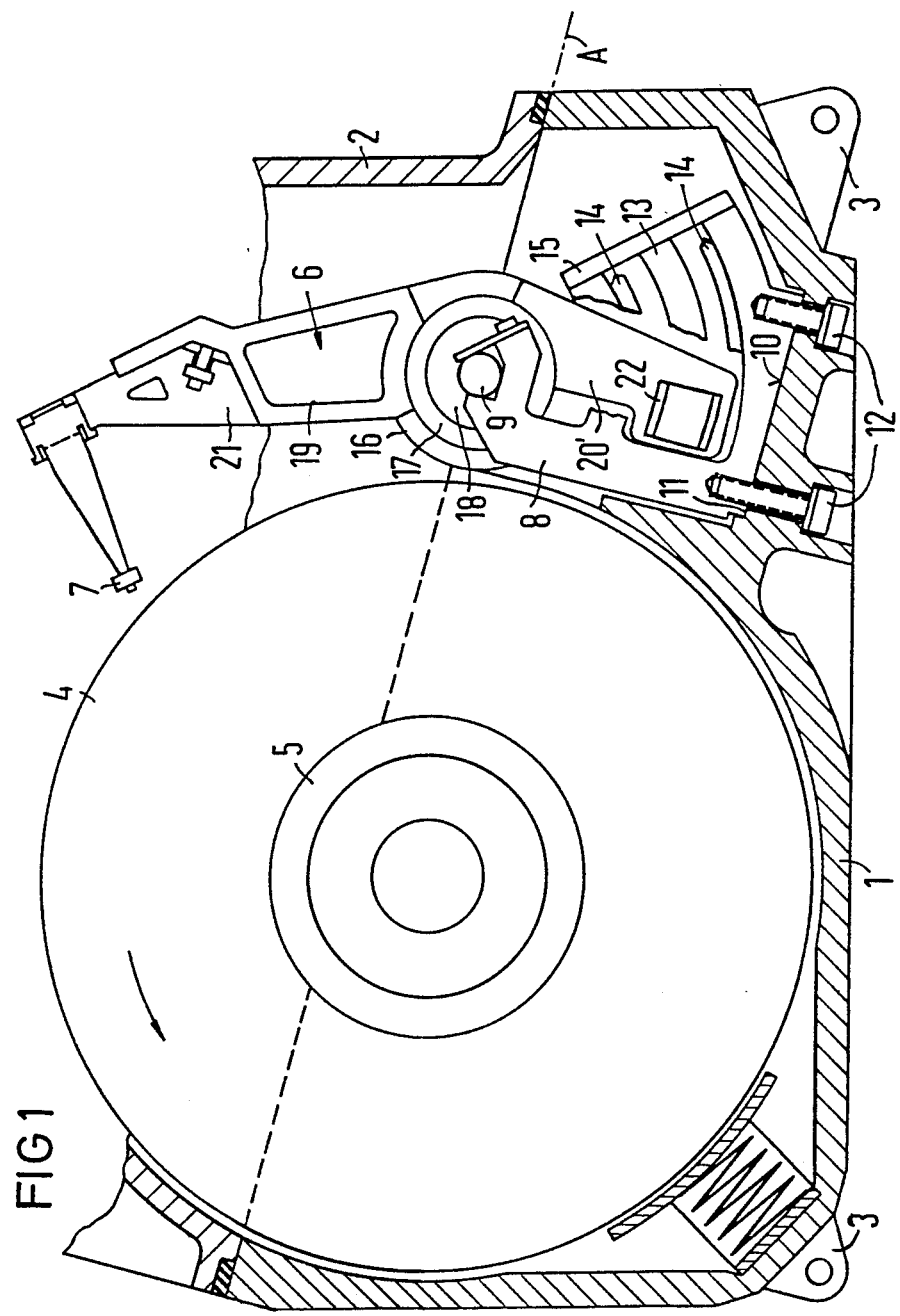
FIG. 1 illustrates a plan view of the disk drive apparatus, partly in section, showing a disk and its rotational positioner.

Referring now to the drawings, the disk storage unit is illustrated in FIG. 1. It is adapted to fit in a housing which is essentially rectangular, and which is subdivided along a diagonal parting plane A into a supporting shell 1 and a cover 2. The supporting shell 1, as well as cover 2, employ fastening ears 3, by which the housing may be suspended in a frame (not shown).

The housing is illustrated partially in cross-sectional form in order to show the essential structural components of the disk unit. A disk pack 4 incorporating one or more disks, rotates on a hub 5 in the direction of the arrow. A rotational positioner carrying magnetic heads 7 is disposed laterally next to the disk pack 4. In FIG. 1 the rotational positioner 6 is shown in simplified form, and in a position retracted away from the disk pack 4, which position is not assumed during normal operation of the disk drive.

The rotational positioner 6 comprises a U-shaped bearing block 8 which supports a positioning shaft 9 at the ends of its two legs. One of the legs is illustrated in plan view in FIG. 1, and the positioning shaft 9 is aligned in parallel to the axis of the disk drive pack 4. The bearing block 8 is located within the supporting shell 1, and the parting plane A, which forms the edge of the supporting shell 1, is the dimensional plane of reference for positioning the bearing block 8. The block 8 is mounted by means of screws 12 to an end wall of the supporting shell 1. The supporting shell 1 in this area is provided with an accurate screwing surface 10 which is parallel to the parting plane A. A ledge 11 is provided on the surface 10 to assist in centering the bearing block 8.

The rotational positioner is designed in accordance with the swinging coil principle. Alternatively, it may be designed in accordance with the magnetic armature principle. In the present case, the bearing block 8 forms part of the magnet system. A magnetic core designed as a section of an annulus is disposed between its legs for this purpose. Correspondingly shaped permanent magnets 14 are mounted on the bearing block 8, concentrically to the magnetic core 13. A flux return plate 15 is fixed to the free ends of the magnetic core and to the permanent magnets to form a magnetic yoke. The bearing block 8 accordingly assumes a double function. It allows the positioning shaft 9 to be seated at both sides, and at the same time forms a part of the magnetic system for the rotational positioner 6.

A swivel member 16 is rotatably seated on the stationary positioning shaft 9. It incorporates a hub 17 which is rotatably seated on the positioning shaft 9 by means of ball bearings, and also incorporates pivot arms 19 connected with brackets 20 and 20', which project from the hub 17 in opposite directions relative to the positioning shaft 9. A magnetic head base plate 21 is secured to each of the pivot arms 19 and each of the base plates carry a pair of resiliently mounted magnetic heads 7. The brackets 20 and 20' are aligned parallel to each other and are seated on opposite sides of the hub 17. A coil 22 is disposed between the free ends surrounding the magnetic coil 13, between the permanent magnets 14. The bearing block 8 is shown partially cut away in FIG. 1 in order to better illustrate the magnet system of the rotational positioner 6. The coil 22 is visible in FIG. 1 because the front bracket 20 is cut away. The rear bracket 20' is visible behind the coil 22.

Figure 2:
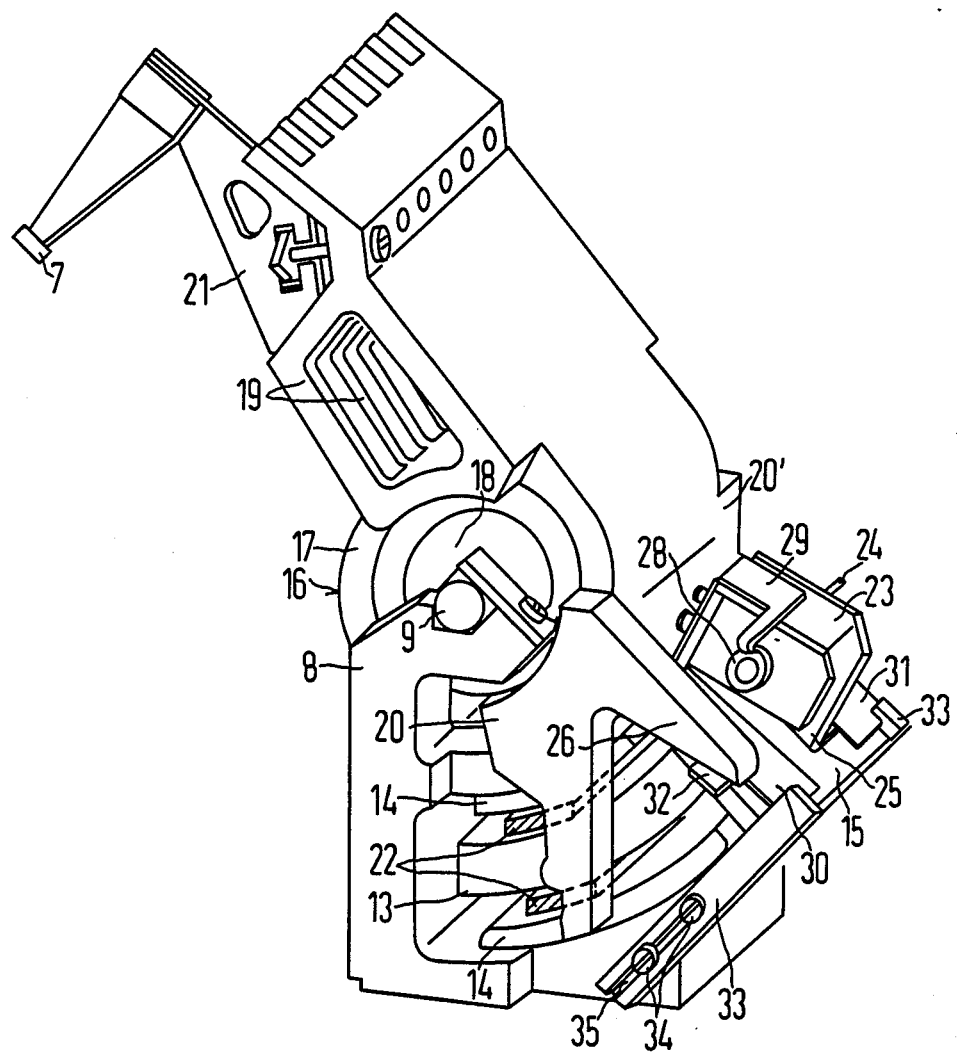
FIG. 2 illustrates, in three dimensional form, the rotational positioner of FIG. 1.
Figure 3:
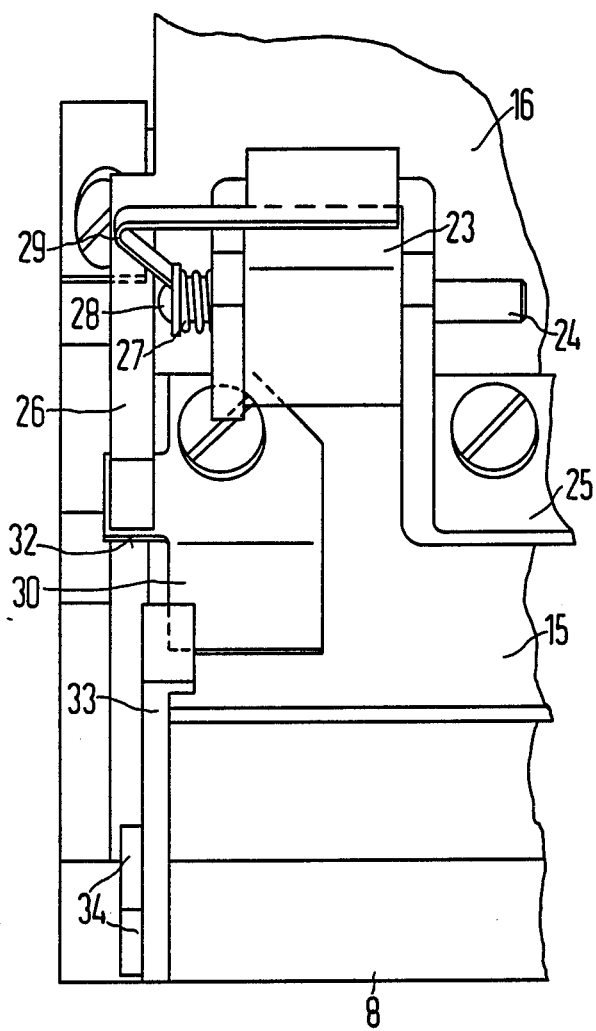
FIG. 3 is a partial view of the rotational positioner of FIG. 2, illustrating the structure of the detent magnet and the braking mechanism.

Whereas FIG. 1 shows the overall structure of the disk storage apparatus in schematic form, and the structure of the rotational positioner 6 with reference to the disk pack 4, further details of the rotational positioner may be derived from the three dimensional illustration in FIG. 2 and the partial view of FIG. 3. These figures illustrate the structure which serves to unequivocally define the swivel range of the rotational positioner 6 and to establish a detent position in one of two final positions.

The detent magnet 23 is secured to the flux return plate 15 and thence to the bearing block 8. It has a stop armature 24 in the form of a pin aligned parallel to the axis of the shaft 9. This alignment, and also the angular position of the armature relative to the axis of the positioning shaft 9 contribute to its function. As shown in FIG. 2, the detent magnet is secured to the flux return plate 15 by means of an angle bracket 25, and is supported in a tilted attitude relative to the flux return plate 15. This positions the stop armature 24 in order to define the detent position of the rotational positioner 6.

The front bracket 20 has a stop arm 26 projecting at a definite angle relative to the axis of the hub 17. When the mechanism is in its detent position (not shown in FIG. 2) the rotational positioner 6 has completely swung in toward the center of the disk pack 4 after a counter-clockwise movement. The stop arm 26 is pivoted upwardly by this motion so far that it lies above the axis of the stop armature 24. When the stop armature is in its detent position, which is toward the viewer as illustrated in FIG. 2, the armature blocks a return clockwise rotation of the stop arm 26 and thus of the entire pivot member 16.

As shown in FIGS. 2 and 3, the rotational positioner 6 is in a position of excursion which corresponds to an operating position. In this condition, the stop armature 24 is urged outwardly (leftwardly as illustrated in FIG. 3) under the bias of a compression spring 27, arranged coaxially with the stop armature 24, between the housing of the detent magnet 23 and a disk-shaped shoulder 28 disposed at the end of the stop armature 24. However, the leftward movement of the stop armature 24 is limited in order to keep the pivot member 16 freely pivotable. This is achieved with the aid of a retaining spring 29 which is formed as a leaf spring and is secured to the detent magnet 23. It has a tongue which has one portion aligned in parallel with the axis of the stop armature 24, and is bent over at its front end in the direction toward the armature in order to form a latch for the stop armature 24. In latched condition, the bent end of the retaining spring 29 engages the outer surface of the diskshaped shoulder 28 of the stop armature 24, and prevents the stop armature 24 from moving forwardly (or leftwardly as illustrated in FIG. 3).

When, in the course of normal shutdown of the disk storage device, or in a case of malfunction, the rotational positioner 6 rotates so that the magnetic heads 7 approach the landing area. This occurs automatically under the influence of slowing down of the drive motor for the disk pack 4. Then the retaining spring 29 is deflected upwardly by the stop arm 26, and unlatches its stop armature 24, preventing the return of the stop arm 26. Due to the bias of the compression spring 27, the released stop armature moves out of the detent magnet 23 as soon as the stop arm 26 has swung past it. This fixes the detent position of the rotational positioner 6 in its swiveled- in position, with the leads located at the landing zone.

When the disk storage device is reenergized, the detent electromagnet 23 is briefly excited by an enable electric pulse. The stop armature is then retracted into the detent magnet 23, the stop arm 26 is released, and finally the retaining spring 29 is again engaged. The enable position for the operation of the rotational positioner 6, is shown in FIGS. 2 and 3, is thus assumed again, and can be maintained without continuous excitation of the detent magnet 23.

The limitation of the pivot excursion of the rotational positioner 6 is promoted for both inner and outer final positions by means of a braking mechanism. To this end two leaf springs 30 and 31 are fixed at one side to the flux return plate 15 next to the detent magnet 23. Both braking springs 30 and 31 are analogous in their construction and operation, so that only one need be described in detail. As illustrated in FIG. 2, the braking spring 30 is disposed at an angled position relative to the flux return plate 15, and has its free end guided by rail 33 which is displaceably secured in the side of the bearing block 8. For this purpose, fastening screws 34 are disposed in a longitudinal slot 35 of the guide rail 33.

As a result of the selected position of the guide rail 33, the position of the braking spring 30 or 31 projects into the plane of rotation of the brackets 20 or 20', respectively at a fixed angular position of the rotating swivel member 16. In the case of the spring 30, this position is set such that the stop arm 26 strikes the tongue 32 when the pivot member 16 has moved to its final swivel position in a clockwise direction, corresponding to the outer edge tracks of the data region on the disk pack 4. The tongue 32 of the first braking spring 30 thus forms a resilient outside detent for limiting the swivel range of the pivot member 16.

Analogously, the function of the second braking spring 31 is to form an inside detent for the other final position, in cooperation with an arm of the bracket 20'. The operation is the same as described above for the spring 30, except that motion is limited in a counterclockwise direction. The shape of the bracket 20', which can only partially be seen in FIG. 2, is identical to that of the bracket 20, and thus it can be appreciated that when the pivot member swivels into its final swung end position, the lateral edge of the bracket 20' engages the tongue of the braking spring 31, thus limiting the inward swivel of the pivot member 16 in the direction toward the hub 5 of the disk pack 4.

The embodiment described above meets all of the necessary requirements in connection with the limitation of the swivel range of the rotational positioner in its two final positions, and an unequivocal fixing of the detent position with the assistance of a self-holding detent magnet. However FIGS. 4 and 5 illustrate an alternative embodiment of the invention. In this case, instead of being disposed on the side facing the bracket 20, the entire interlock mechanism is disposed at the opposite side. Here the stop arm 26 assumes only the function for the detent in the swung out final position. A further stop arm could, if desired, be provided in the plane of rotation of the bracket 20' for locking. A latch pin 36 is employed which, aligned in the plane of rotation of the bracket 20', projects laterally therefrom and triggers the correspondingly shaped retaining spring 29' of the detent magnet.

As a further modification, the detent magnet 23' forms a single structural unit with the flux return plate 15. The stop armature 24' is formed as a conical surface 37 which allows a compensation for manufacturing tolerances in combination with the relatively large stroke of the detent magnet 23', which is made possible because of its pulse-type operation. FIGS. 4 and 5 show the apparatus in the enabled position of the rotational positioner. In the case of a malfunction or a shutdown, the positioner pivots into the landing area of the magnetic head 7, and the retaining spring 29 is unlatched by the stop pin 36, thus freeing the stop armature 24'. The stop armature then blocks the path of the stop pin 36 and thus detains the rotational positioner 6.

It will be apparent that various other modification and additions may be made in the apparatus of the present invention without departing from the essential features of novelty thereof, which are intended to be defined and secured by the appended claims.

What is claimed is:

1. A positioning mechanism for a magnetic disk storage device of the rotational positioner type, comprising a bearing block for mounting a positioning shaft, a swivel unit rotatable about said shaft, said bearing block forming part of a motor system for rotating said swivel unit, said swivel unit comprising a pivot member rotationally seated on said shaft and having pivot arms carrying magnetic heads and brackets for carrying the movable member of the motor system for the rotational positioner, a detent electro-magnet having a solenoid and a stop armature movable between an operating position which is juxtaposed with said pivot member when said pivot member is in a detent position for selectively restraining movement of said pivot member when it has been moved to said detent position and an inoperated position for enabling the first member to rotate freely, said detent magnet solenoid comprisiing an electrical pulse operated solenoid, said stop armature being adapted to move away from said pivot member to its inoperative position in response to a brief excitation of said detent magnet to enable said pivot member to rotate freely, and means for mechanically holding said stop armature in its operating position as long as said pivot member does not swing back into said detent position.

2. Apparatus according to claim 1 wherein said detent magnet is fixed to said bearing block and said armature is arranged in parallel to the axis of said pivot member, and including spring means for biasing said armature toward a position in which said pivot member is retained in detent position, and including a retaining mechanism for retaining the stop armature in position after excitation of said detent magnet and means operative in response to movement of said pivot member into detent position for releasing said stop armature.

3. Apparatus according to claim 2 wherein said stop armature comprises a pin projecting from said detent magnet and having a disk shaped shoulder at its outer end, and wherein said spring means comprise a compression spring for biasing said stop armature outwardly relative to said detent magnet, said spring being disposed coaxially relative to said stop armature between said shoulder and said magnet.

4. Apparatus according to claim 3 wherein said retaining mechanism comprises a retaining spring fixed at one side to said detent magnet, and having a finger with a free end alinged generally parallel with said stop armature, the free end of said finger being adapted to engage said shoulder when said pivot member is in its operating position.

5. Apparatus according to claim 4 wherein the free end of said retaining spring is bent in hook fashion toward the direction of said stop armature.

6. Apparatus according to claim 1 wherein said pivot member has a stop arm lying in a plane, of one of said brackets, and projecting therefrom at a definite angle in relation to the axis of said shaft, and including unlatching means responsive to movement of said stop arm for unlatching said stop armature when said stop arm passes said armature in moving into detent position.

7. Apparatus according to claim 6 including a braking mechanism for acting on said pivot member and for slowing angular rotation thereof when said pivot member reaches its detent position.

8. Apparatus according to claim 7 wherein said braking mechanism comprises a braking spring having one end fixed to said bearing block, and disposed perpendicular to the plane of rotation of said bracket, said braking spring having a tongue projecting from one side into the lane of rotation of said stop arm.

9. Apparatus according to claim 8 including a longitudinally adjustable rail secured to said bearing block and engaging the free end of said spring, whereby the position of said spring may be adjusted.

10. Apparatus according to claim 9 wherein said braking mechanism incorporates a second braking spring for engaging a stop arm when said swivel member reaches its final outward position.

11. Apparatus according to claim 10 wherein said second braking spring comprises a laterally projecting tongue projecting into the plane of rotation of a stop arm.

12. Apparatus according to claim 7 wherein said braking mechanism comprises a pair of braking springs for decelerating said pivot member at its two final positions of movement, corresponding to extreme inner and outer positions of said magnetic heads, said pair of braking springs projecting into the plane of rotation of one of said brackets, one of said springs being adapted to engage said stop arm at a predetermined rotary position of said pivot member, and the other of said springs being adapted to engage another bracket member in the opposite position of said pivot member.

13. Apparatus according to claim 1 wherein said detent magnet forms a structural unit together with a flux return plate forming a magnetic yoke for said rotational positioner.

14. Apparatus according to claim 1 wherein said stop armature comprises a conical surface at the end which projects out of said detent magnet, and including a stop pin secured to said bracket, means operative in response to movement of said stop pin for releasing said stop armature when the detent position of aid rotational positioner is reached, said releasing means including a retaining spring and being operative to release said stop armature by pressing the retaining spring away, whereby said rotational positioner is blocked at said conical surface.

* * * * *